(12) United States Patent
Kung et al.

(10) Patent No.: US 11,072,725 B2
(45) Date of Patent: Jul. 27, 2021

(54) POLYURETHANE COMPOSITIONS FOR COATING

(71) Applicant: CROSSLINK TECHNOLOGY INC., Mississauga (CA)

(72) Inventors: Jimmy Kung, Mississauga (CA); John Ulcar, Mississauga (CA); Dipak Parekh, Mississauga (CA)

(73) Assignee: Crosslink Technology, Inc., Ontario (CA)

( * ) Notice: Subject to any disclaimer, the term of this patent is extended or adjusted under 35 U.S.C. 154(b) by 163 days.

(21) Appl. No.: 16/225,184

(22) Filed: Dec. 19, 2018

(65) Prior Publication Data

US 2020/0199401 A1  Jun. 25, 2020

(51) Int. Cl.
| | |
|---|---|
| C09D 175/04 | (2006.01) |
| C09D 7/63 | (2018.01) |
| C08K 5/00 | (2006.01) |
| C08K 5/3445 | (2006.01) |
| C08L 75/04 | (2006.01) |
| C08G 18/22 | (2006.01) |
| C08G 18/20 | (2006.01) |

(52) U.S. Cl.
CPC .......... *C09D 175/04* (2013.01); *C08K 5/0016* (2013.01); *C08K 5/3445* (2013.01); *C08L 75/04* (2013.01); *C09D 7/63* (2018.01); *C08G 18/2027* (2013.01); *C08G 18/22* (2013.01)

(58) Field of Classification Search
CPC ...... C09D 7/63; C09D 175/04; C08K 5/3445; C08K 5/0016; C08G 18/22; C08G 18/2027
USPC ........................................................ 524/590
See application file for complete search history.

(56) References Cited

U.S. PATENT DOCUMENTS

| | | | |
|---|---|---|---|
| 3,386,962 A | 6/1968 | Adolfas | |
| 4,395,530 A * | 7/1983 | Hammond | C08G 18/089 528/44 |
| 5,233,009 A * | 8/1993 | Madan | C08G 18/10 528/60 |
| 6,460,304 B1 | 10/2002 | Kim | |
| 6,606,836 B2 | 8/2003 | Miller | |
| 8,993,706 B2 | 3/2015 | Schubert et al. | |
| 2003/0206775 A1 | 11/2003 | Markusch et al. | |
| 2008/0015310 A1 | 1/2008 | Tong | |
| 2009/0281206 A1 * | 11/2009 | Van der Wal | C08F 283/06 521/170 |
| 2016/0083540 A1 | 3/2016 | Makal et al. | |
| 2016/0312090 A1 * | 10/2016 | Kulkarni | C08G 18/10 |
| 2017/0260319 A1 | 9/2017 | Ishmael et al. | |
| 2018/0162988 A1 | 6/2018 | Colson et al. | |

FOREIGN PATENT DOCUMENTS

| | | |
|---|---|---|
| CN | 101665654 | 3/2010 |
| JP | 5027854 | 9/2012 |
| JP | 2016-196400 | 11/2016 |
| WO | WO 2014/115521 | 7/2014 |
| WO | WO 2018/019904 | 2/2018 |
| WO | WO 2018/108655 | 6/2018 |

OTHER PUBLICATIONS

"Introduction to Polyurethanes: Thermoplastic Polyurethane," American Chemistry Council, 3 pages [retrieved online Jul. 13, 2018 from: polyurethane.americanchemistry.com/Introduction-to-Polyurethanes/Applications/Thermoplastic-Polyurethane/].

Abdeen "Polyurethane Rubber-Based Nanoblends: Preparation, Characterization and Applications," Rubber Nano Blends, 2017, editors Markovic and Visakh, pp. 89-103 (Abstract only).

Matthew et al. "Strength Analysis—Building Frame with Polyurethane Cement Composite (PUC)," Apr. 2018, vol. 5, No. 4, pp. 4567-4572.

Zaimahwati et al. "Thermal and Adhesive with The Addition of Local Montmorillonite Nanoparticles to The Manufacture of Nanocomposites Polyurethane," International Conference of Applied Science on Engineering, Business, Linguistics and Information Technology (Ico-ASCNITech 2017), Politeknik Negeri Padang and Politeknik Ibrahim Sultan, Oct. 2017, pp. 52-56.

* cited by examiner

*Primary Examiner* — Doris L Lee

(74) *Attorney, Agent, or Firm* — Sheridan Ross P.C.

(57) ABSTRACT

The present disclosure provides a polyurethane composition comprising a reaction product of an isocyanate component comprising one or more aromatic isocyanates, wherein the aromatic isocyanate has an isocyanate (NCO) content of about 2-30% NCO; and a polyol component comprising a polyol having an equivalent weight (EW) of about 1500-2500, an aromatic diamine, a moisture scavenger and a catalyst. A process for preparing the polyurethane composition and an article, coating or film comprising the polyurethane composition are also provided.

20 Claims, 1 Drawing Sheet

POLYURETHANE COMPOSITIONS FOR COATING

TECHNICAL FIELD

This disclosure relates to a urethane composition. In particular, this disclosure relates to a polyurethane composition for coating various objects and methods for making such composition and applications of such composition. The polyurethane composition of the present disclosure may be water resistant and may also set or cure quickly and have superior tear or abrasion resistance and durability.

BACKGROUND

Polyurethane based systems are used for producing various coatings. They generally comprise an isocyanate component and a polyol component. Some of the existing polyurethane based coating systems do not set quickly. Other known systems do not perform well in the presence of moisture. This may be because the isocyanate portion of the system has a stronger affinity for, or reacts faster with water than the polyol portion, to produce carbon dioxide. As a result, air bubbles can form in the resulting coating (also known as foaming) and the coating may have poor tear or abrasion resistance or poor durability. In some applications where the coating substrate has a surface that is susceptible to moisture absorption, for example, a cardboard, it may be undesirable to use a polyurethane based system due to its hydrophilicity towards water.

It is desirable to provide a polyurethane based coating system, which may set quickly, and may also be water resistant under ambient humidity, and the resulting coating may have superior tear or abrasion resistance and durability.

SUMMARY

In one aspect, the disclosure provides a polyurethane composition comprising a reaction product of an isocyanate component comprising one or more aromatic isocyanates, wherein the aromatic isocyanate has an isocyanate (NCO) content of about 2-30%; and a polyol component comprising a polyol having an equivalent weight (EW) of about 1500-2500, an aromatic diamine, a moisture scavenger and a catalyst.

In another aspect, the present disclosure provides an article, a coating or a film, which comprises a polyurethane composition of the present disclosure.

In another aspect, the present disclosure provides a process for preparing a polyurethane composition. The process comprises providing an isocyanate component comprising one or more aromatic isocyanates, wherein the aromatic isocyanate has an isocyanate (NCO) content of 2-30%, providing a polyol component comprising a polyol having an equivalent weight (EW) of 1500-2500, an aromatic diamine, a moisture scavenger and a catalyst and reacting the isocyanate component with the polyol component to produce the polyurethane composition.

In another aspect, the present disclosure provides a kit for a polyurethane composition. The kit comprises an isocyanate component comprising one or more aromatic isocyanates, wherein the aromatic isocyanate has an isocyanate (NCO) content of about 2-30%; a polyol component comprising a polyol having an equivalent weight (EW) of about 1500-2500, an aromatic diamine, a moisture scavenger and a catalyst; and handling instructions for making the polyurethane composition.

In another aspect, the present disclosure provides a polyurethane based coating system comprising an isocyanate component comprising one or more aromatic isocyanates, wherein the aromatic isocyanate has an isocyanate (NCO) content of about 2-30%; and a polyol component comprising a polyol having an equivalent weight (EW) of about 1500-2500, an aromatic diamine, a moisture scavenger and a catalyst. The isocyanate component and the polyol component react to form a polyurethane based coating when the two components are mixed together.

BRIEF DESCRIPTION OF THE DRAWINGS

An embodiment will now be described in detail by way of example, with reference to the accompanying drawings in which.

DETAILED DESCRIPTION

Figure 1:
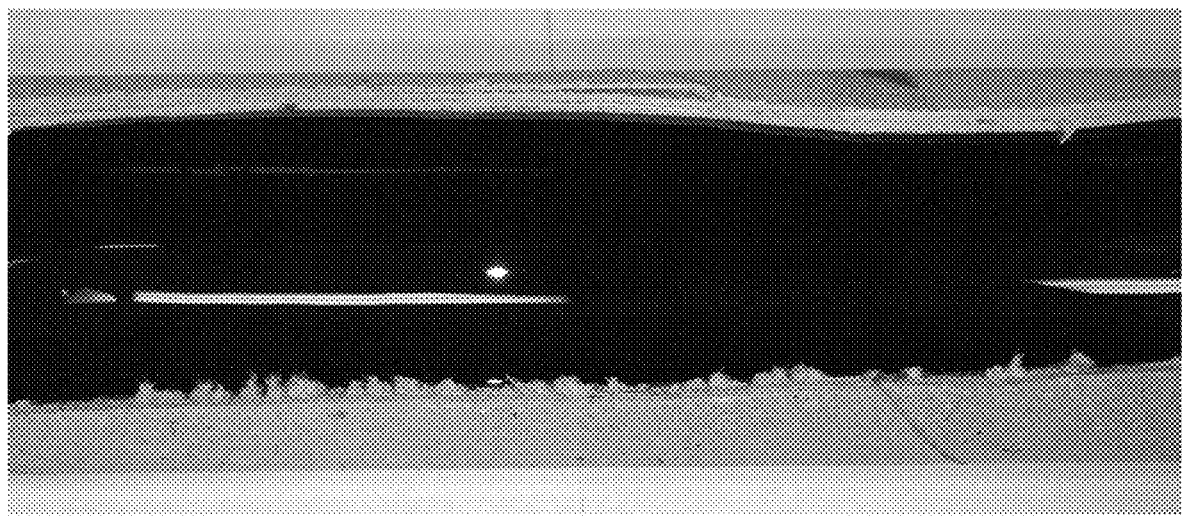
FIG. 1 is a photographic representation showing a coating resulting from a polyurethane composition according to one embodiment of the present disclosure.

The description, which follows, and the embodiments described therein, are provided by way of illustration of an example, or examples of particular embodiments of principles and aspects of the present invention. These examples are provided for the purposes of explanation, and not of limitation, of those principles and of the invention.

The present disclosure provides a polyurethane composition comprising a reaction product of an isocyanate component comprising one or more aromatic isocyanates, and a polyol component comprising a polyol, an aromatic diamine, a moisture scavenger and a catalyst. The polyurethane composition can be used to coat various substrates. The polyurethane composition may cure quickly and may be water resistant under ambient conditions. Coatings resulting from the polyurethane composition may have superior tear or abrasion resistance and durability.

In one embodiment, the polyurethane composition comprises a reaction product of an isocyanate component and a polyol component. The isocyanate component comprises one or more aromatic isocyanates, wherein the aromatic isocyanate has an isocyanate (NCO) content of about 2-30%. The aromatic isocyanate is present in about 80-100 wt % based on the total mass or weight of the isocyanate component. The aromatic isocyanate may be an aromatic isocyanate prepolymer, or an aromatic polyisocyanate. The isocyanate component may further comprise a non-reactive plasticizer and/or an air release agent. The polyol component comprises a polyol having an equivalent weight (EW) of about 1500-2500, an aromatic diamine, a moisture scavenger and a catalyst. The polyol is present in about 55-85 wt % of the polyol component. The polyol component may further comprise an aromatic plasticizer, an air release agent, and/or dye.

In one embodiment, the reaction product comprises about two parts of the isocyanate component and about one part of the polyol component by volume. For each component, the allowable deviation may be about ±5%.

In some embodiments, the isocyanate component and the polyol component may be provided in a kit with instructions on how to prepare a polyurethane composition of the present disclosure.

Isocyanate Component

The term "isocyanate component" is used interchangeably with the term "resin" throughout the present disclosure and may be understood as an electrophile. The isocyanate component comprises one or more aromatic isocyanates, wherein the aromatic isocyanate has an isocyanate (NCO) content of about 2-30%. As well understood by a person of ordinary skill in the art, the term "NCO content" is a measure of the content of unreacted isocyanate groups of an isocyanate prepolymer or other isocyanate-containing compound, measured as the weight percent of unreacted isocyanate groups in the material. Aromatic isocyanates having about 2-30% NCO known in the art may be used. For example, one exemplary isocyanate is an aromatic diisocyanate having about 8% NCO.

Exemplary aromatic isocyanates include aromatic isocyanate prepolymers or aromatic polyisocyanates. Aromatic isocyanate prepolymers may include isocyanates that have at least one aromatic moiety substituted with at least one unreacted isocyanate moiety. In some embodiments, the aromatic isocyanate prepolymer may be an aromatic diisocyanate such as a methylenediphenyl diisocyanate (MDI) and a toluene diisocyanate (TDI), and any derivatives thereof. Exemplary MDIs include 4,4'-, 2,4'- and 2,2'-isomers of MDI and their derivatives. Exemplary TDIs include 2,4- and 2,6-isomers of TDI and their derivatives.

Examples of aromatic polyisocyanate include a polymeric MDI, a blend of a polymeric MDI and a MDI, a polymeric TDI, a blend of a polymeric TDI and a TDI, and any blend or combination thereof. The repeating units of the polyisocyanate may be any one of the prepolymers described above, including any combinations of the prepolymers described above.

In some embodiments, the aromatic isocyanate prepolymer or polyisocyanate is a reaction product of an aromatic isocyanate prepolymer and a polyol reactant. Any polyol reactants containing reactive hydroxyl groups known in the art may be used. For example, when a polyol reactant contains an active hydroxyl group, the reaction of the active hydroxyl group with an isocyanate moiety results in the formation of a urethane linkage. As such, the prepolymer may include both a urethane linkage and an isocyanate terminal group. In some embodiments, the polyol reactant may be polypropylene glycol, polyether polyol, polyester polyol, trimethylolpropane (TMP) or any combinations or derivatives thereof. Exemplary polyols may include 1,2-propylene glycol, ethylene glycol, glycerine, polytetramethylene ether glycol (PTMEG), pentaerythritol and the like. In some embodiments, the aromatic isocyanate or polyisocyanate may be prepared in a one-pot procedure using at least one polyether polyol and any one of the aforementioned aromatic diisocyanates according to any of the known methods in the art.

In some embodiments, the aromatic isocyanates may account for about 80-100 wt % of the isocyanate component. In one embodiment, the aromatic isocyanates are MDIs having about 8% NCO and account for about 95 wt % of the isocyanate component.

Polyol Component

The term "polyol component" is used interchangeably with the terms "hardener" or "curative" throughout the present disclosure and may be understood as a nucleophile. The polyol component comprises a polyol having an equivalent weight (EW) of about 1500-2500, an aromatic diamine, a moisture scavenger and a catalyst.

As well understood by a person of ordinary skill in the art, in polymer chemistry, the equivalent weight (EW) of a reactive polymer is the weight of a compound per reacting site. This term is generally used to indicate the reactivity of a polymer for example, a polyol. The EW value of a polymer may be calculated according to the following equation:

$$\text{Equivalent Weight} = \frac{\text{Molecular Weight}}{\text{Functionality}}.$$

In the case of a polyol or a polyol blend, the average equivalent weight is normally calculated according to the following equation:

$$\text{Equivalent Weight} = \frac{56.1 \times 1000}{\text{OH Number} + \text{acid number}}.$$

Any polyols having an EW of about 1500-25000 known in the art may be used. In one embodiment, the polyol is polypropylene glycol polyether triol having an EW of about 2000.

Examples of suitable polyols include a polypropylene glycol based polyol, polyether polyol, polyester polyol, polycaprolactone polyol and any combinations or derivatives thereof. Exemplary polyols may be 1,2-propylene glycol, polypropylene glycol, polyether glycol, ethylene glycol, glycerine, polytetramethylene ether glycol (PTMEG) or pentaerythritol. In some embodiments, the polyester polyol may be prepared from reacting diacids and glycols of various molecular weights ranging from about 200-2000. In other embodiments, the polylactone polyol may be any cyclic polyester glycols with various molecular weights ranging from about 200-2000.

In exemplary embodiments, the polyol may account for about 55-85 wt % of the polyol component. In one embodiment, the polyol is polypropylene glycol polyether triol having an EW of about 2000 and accounts for about 60 wt % of the polyol component.

Without being limited to any particular theory, it is generally understood that the hydroxyl functional groups of the polyol react with the isocyanates from the isocyanate components to produce polyurethanes.

The polyol component further comprises an aromatic diamine in the amount of about 8-35 wt % of the polyol component. Any known aromatic diamines may be used. In one embodiment, about 34 wt % of an aromatic thiol amine is used. Other examples of suitable aromatic diamines include any aromatic diamines having a molecular weight of about 100 to about 500 such as 2,4-toluene diamine and 2,5-toluene diamine. Without being limited to any particular theory, it is hypothesized that the aromatic diamine may assist in building the mechanical properties of the resulting coating quickly by facilitating the setting of the polyurethane composition.

The polyol component further comprises a catalyst to facilitate the formation of the polyurethane composition. Any commercially available catalyst known in the art may be used. Suitable catalysts may be either amine based, for example, imidazole based, or metal based, or a combination thereof, and can be readily selected based on the other elements of the composition. In one embodiment, the catalyst is present in small amounts, for example, in the amount of about 0.05-1.0 wt % of the polyol component. In another embodiment, the catalyst is an imidazole catalyst in about 0.1 wt % of the polyol component. In other embodiments, the catalyst may be selected from a tin based catalyst such as a tin carboxylate, or an organotin compound. Other suitable amine catalysts may include 1,4-diazabicyclo[2.2.2]octane (DABCO) and its derivatives.

Without being limited to any particular theory, when forming the polyurethane composition, in addition to the formation of the urethane linkages, there may also be reactions of the isocyanates with water to cause foaming or bubbling and trimerization of the isocyanates to form isocyanurates. A suitable catalyst may be selected so as to favor the formation of the urethanes over the other two reactions. For example, an imidazole catalyst in the amount of 0.1 wt % may be selected.

In some embodiments, to enhance the water resistance property of the polyurethane composition, a moisture scavenger may be added to the polyol component. If included, the moisture scavenger may be present in an amount of about 0.05 wt % to about 2 wt % of the polyol component. Exemplary moisture scavengers may be any chemical or physical moisture scavengers known in the art. For example, the chemical moisture scavengers may be any oxazolidines that are commonly used as such and the physical moisture scavengers may be any zeolites that are commonly used as such.

Additives

Various additives may be added to the isocyanate component and/or to the polyol component to further adjust the properties and/or appearances of the resultant coatings.

Exemplary additives that may be added to the isocyanate component may include a non-reactive plasticizer and/or an air release agent. The non-reactive plasticizer may be present in up to about 20 wt % of the isocyanate component, for example, about 5 wt %. The non-reactive plasticizer may be an aromatic plasticizer such as phthalate based oil.

Exemplary air release agent may be any known air release agent and may account for up to about 1.0 wt % of the isocyanate component, for example, about 0.10 wt %.

Exemplary additives that may be added to the polyol component may include a non-reactive plasticizer, an air release agent and/or a dye. The non-reactive plasticizer may be present in an amount of up to about 10 wt % of the polyol component, for example, about 3 wt %. The non-reactive plasticizer may be an aromatic plasticizer such as phthalate based oil.

Exemplary air release agent may be any known air release agent and may account for up to about 1.0 wt % of the isocyanate component, for example, 0.40 wt %.

A dye may be added to the polyol component to allow the resultant coating to appear in a specific colour. The particular dye and the amount of dye may be selected in accordance with the desired appearance of the coating.

Polyurethane Composition

A polyurethane composition may be prepared by mixing the isocyanate component with the polyol component in situ before applying the composition to a substrate and then allowing the resultant mixture to cure to form a polyurethane based coating on the substrate. In one embodiment, the mixture is about 2 parts isocyanate component and about 1 part polyol component by volume. An optimal ambient temperature may be between about 18° C. to about 35° C.

It should be noted that the amount of the elements in either the isocyanate component or the polyol component may be varied depending on the intended application of the polyurethane composition, for example, to alter mechanical properties of the resultant coating formed using the composition.

Exemplary substrates for coating may include paper products, textiles, wood products, metals, plastics, natural stones and minerals. Essentially, the polyurethane composition of the present disclosure may apply to any substrate surface that is susceptible to moisture under ambient conditions.

It has been found that in some embodiments, coatings formed using the polyurethane composition provide good water resistance while still realizing desirable mechanical properties such as hardness. It has also been found that in some embodiments, the reaction mixture cure quickly, for example, within about 5-15 minutes under ambient conditions. In other embodiments, the resultant coating may adopt a glasslike finish possibly due to carbon dioxide formation during curing.

Example compositions can be prepared from the ingredients shown in Table 1 below.

TABLE 1

Example Formulations

| Isocyanate Component (Resin) | | |
|---|---|---|
| Ingredient | Concentration (Range) (wt %) | Property |
| Methylene diisocyanate prepolymer | 94.9% (80-100%) | 8% NCO (2-30% NCO) |
| Aromatic plasticizer (Phthalate based oil) | 5% (0-20%) | Any non-reactive plasticizer |
| Air Release agent | 0.10% (0-1.0%) | |

| Polyol Component (Curative or Hardener) | | | |
|---|---|---|---|
| Ingredient | Concentration (Range) (wt %) | Property (range) | Exemplary Alternatives |
| Polypropylene glycol polyether triol | 60.0% (55-85%) | 2000 EW (1500-2500 EW) | Polyether, polyester, or polycaprolactone based polyols - either diols or triols |
| Aromatic thiol diamine | 34% (8-35%) | | Other aromatic diamines |
| Imidazole catalyst | 0.1% (0.05-1.0%) | | Other imidazole catalysts, metal based catalysts |
| Aromatic plasticizer | 3% (0-10%) | Non-reactive plasticizer | Phthalate based oils |
| Reactive moisture scavenger | | | Oxazolidines, zeolites, other known chemical or physical moisture scavengers |
| Air release agent | 0.4% (0.0-1.0%) | | Any air release agent |
| Dye | 2% | | |

Figure 2:
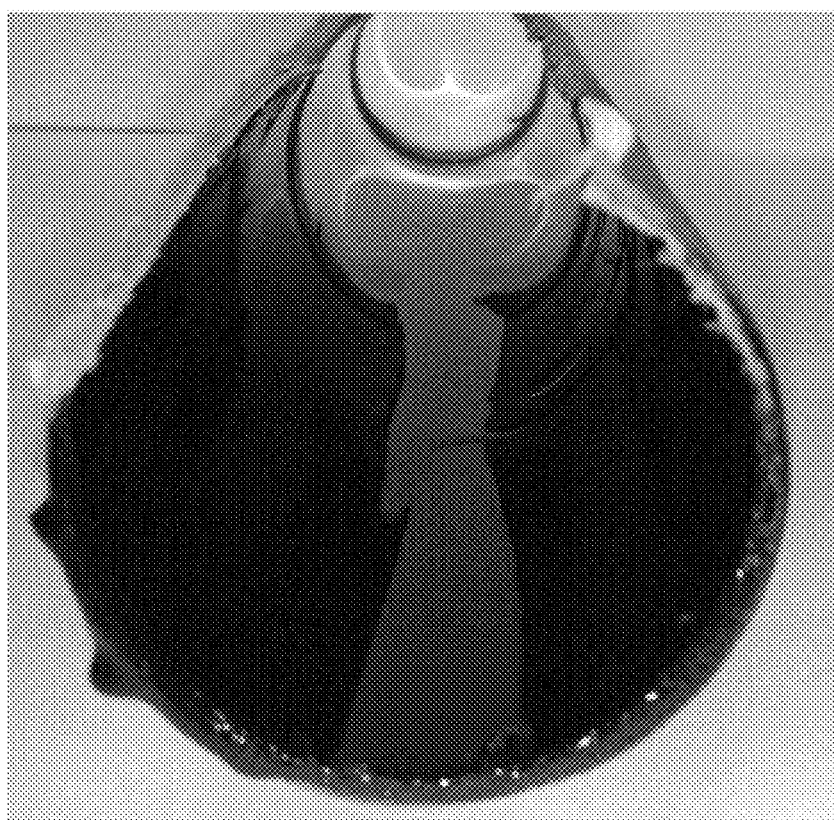
FIG. 2 is a photographic representation taken from a different angle showing the coating of FIG. 1.

Exemplary polyurethane compositions prepared according to Table 1 above may have the properties shown in Table 2 below. FIGS. 1 and 2 show a coating resulting from an exemplary polyurethane composition made according to one embodiment of the present disclosure. The coating is the area shown in black.

TABLE 2

Composition Properties

| Property | Value | Range |
| --- | --- | --- |
| Hardness[a] | 90 Shore A | 60-99 Shore A |
| Gel time of 100 gm mass at 22° C. | 6 minutes | 5-15 minutes |
| Pot life of 100 gm mass at 22° C. | 4 minutes | 1-8 minutes |
| Mixed viscosity at 22° C.[b] | 3500 cps | 2000-4000 cps |
| Peak exotherm 100 gm mass at 22° C. | 45° C. | |
| Specific gravity | 1.08 | |

[a]All measurements made by shore hardness Durometer unless otherwise specified.
[b]All measurements made by viscometer, analog or digital, spindle 4, 10 RPM unless otherwise specified.

Without intending to limit the scope of the exemplary embodiment, the following examples are intended to illustrate exemplary polyurethane compositions.

EXAMPLES

Example 1 Polyurethane Composition

A polyurethane composition was prepared in accordance with Table 1 above.

The specifications of the resin and curative are shown in Table 3 below.

TABLE 3

Specifications for Resin and Curative

| Property | Resin | Curative |
| --- | --- | --- |
| Viscosity at 22° C.[b] | 2,800-3,300 cps | 1,700-2,200 cps |
| Specific gravity | 1.08 ± 0.03 gm/cm$^3$ | 1.20 ± 0.03 gm/cm$^3$ |
| Shelf life | 12 months | 12 months |

[b]All measurements made by viscometer, analog or digital, spindle 4, 10 RPM unless otherwise specified.

The resin and the curative were mixed at a ratio of 100:55.2 (±2%) by weight (or 100:50.0 by volume).

The resulting polyurethane composition set quickly. The resulting coating was water resistant and had superior tear resistance and durability. Some properties of the composition and the resulting coating are sown in Table 4 below.

TABLE 4

Properties of Polyurethane Composition and Coating

| Property | Value |
| --- | --- |
| Mixed viscosity at 22° C.[b] | 3,000 cps |
| Shore hardness[a] | 93A |
| Specific gravity | 1.08 gm/cm$^3$ |
| Tear strength (ASTM D624) | Die C Tear - 450 PSI<br>Die T Tear - 130 PSI |

[a]All measurements made by shore hardness Durometer unless otherwise specified.
[b]All measurements made by viscometer, analog or digital, spindle 4, 10 RPM unless otherwise specified.

While the principles of the invention have been shown and described in connection with specific embodiments, it is to be understood that such embodiments are by way of example and are not limiting. As is evident from the foregoing description, certain aspects of the present invention are not limited by the particular details of the invention illustrated in the drawings. Other modifications and applications, or equivalents, will occur to those skilled in the art. The terms "having", "comprising" and "including" and similar terms as used in the foregoing specification are used in the sense of "optional" or "may include" and not as "required". Many changes, modifications, variations and other uses and applications of the present construction will, however, become apparent to those skilled in the art after considering the specification and attached drawings. All such changes, modifications, variations and other uses and applications which do not depart from the spirit and scope of the invention are deemed to be covered by the invention which is limited only by the claims that follow. The scope of the disclosure is not intended to be limited to the embodiments shown herein, but is to be accorded the full scope consistent with the claims, wherein reference to an element in the singular is not intended to mean "one and only one" unless specifically so stated, but rather one or more.

It will be understood that any range of values herein is intended to specifically include any intermediate value or sub-range within the given range, and all such intermediate values and sub-ranges are individually and specifically disclosed.

When a list of items is given herein with an "or" or "and" before the last item, any one of the listed items or any suitable combination of two or more of the listed items may be selected and used.

What is claimed is:

1. A polyurethane coating composition for application under ambient conditions, the composition comprising a reaction product of
    an isocyanate component comprising one or more aromatic isocyanates, wherein the one or more aromatic isocyanates have an isocyanate (NCO) content of 2-17%; and
    a polyol component comprising a polyol having an equivalent weight (EW) of about 1500-2500, an aromatic diamine, a moisture scavenger and a catalyst.

2. The polyurethane coating composition of claim 1, wherein the one or more aromatic isocyanates are present in an amount of about 80-100 wt % of the isocyanate component.

3. The polyurethane coating composition of claim 1, wherein the one or more aromatic isocyanates are an aromatic isocyanate prepolymer or an aromatic polyisocyanate.

4. The polyurethane coating composition of claim 3, wherein the aromatic isocyanate prepolymer is an aromatic diisocyanate, the diisocynate being a methylenediphenyl diisocyanate (MDI) or a toluene diisocyanate (TDI) or any derivatives thereof.

5. The polyurethane coating composition of claim 4, wherein the MDI has an NCO content of about 8% and is present in an amount of about 95 wt % of the isocyanate component.

6. The polyurethane coating composition of claim 1, wherein the isocyanate component further comprises a non-reactive plasticizer in an amount of less than 20 wt % of the isocyanate component.

7. The polyurethane coating composition of claim 1, wherein the isocyanate component further comprises an air release agent in an amount of less than 1.0 wt % of the isocyanate component.

8. The polyurethane coating composition of claim 7, wherein the air release agent is present in about 0.1 wt % of the isocyanate component.

9. The polyurethane coating composition of claim 1, wherein the polyol is present in an amount of about 55-85 wt % of the polyol component.

10. The polyurethane coating composition claim 1, wherein the polyol is a polypropylene glycol based polyol, a polyether polyol, a polyester polyol, or a polylcaprolactone polyol, or any combination or derivative thereof.

11. The polyurethane coating composition of claim 10, where the polypropylene glycol based polyol is polypropylene glycol polyether triol having an EW of about 2000 and is present in an amount of about 60.0 wt % of the polyol component.

12. The polyurethane coating composition of claim 1, wherein the aromatic diamine is an aromatic thiol diamine present in an amount of about 8-35 wt % of the polyol component.

13. The polyurethane coating composition of claim 1, wherein the moisture scavenger is a chemical or a physical moisture scavenger.

14. The polyurethane coating composition of claim 1, wherein the catalyst is an amine based catalyst or a metal based catalyst, or any combination thereof.

15. The polyurethane coating composition of claim 1, wherein the catalyst is imidazole.

16. The polyurethane coating composition of claim 1, wherein the polyol component further comprises an aromatic plasticizer, an air release agent, or a dye or any combination thereof.

17. A process for preparing a polyurethane coating composition under ambient conditions, the process comprising
providing an isocyanate component comprising one or more aromatic isocyanates, wherein the one or more aromatic isocyanates have an isocyanate (NCO) content of 2-17%;
providing a polyol component comprising a polyol having an equivalent weight (EW) of 1500-2500, an aromatic diamine, a moisture scavenger and a catalyst;
reacting the isocyanate component with the polyol component to produce the polyurethane composition.

18. An article, a coating or a film, comprising the polyurethane coating composition of claim 1.

19. A kit for a polyurethane coating composition for application under ambient conditions, the kit comprising
an isocyanate component comprising one or more aromatic isocyanates, wherein the one or more aromatic isocyanates have an isocyanate (NCO) content of about 2-17%;
a polyol component comprising a polyol having an equivalent weight (EW) of about 1500-2500, an aromatic diamine, a moisture scavenger and a catalyst; and
handling instructions for making the polyurethane coating composition.

20. A polyurethane based coating system for application under ambient conditions, the system comprising
an isocyanate component comprising one or more aromatic isocyanates, wherein the one or more aromatic isocyanates have an isocyanate (NCO) content of about 2-17%; and
a polyol component comprising a polyol having an equivalent weight (EW) of about 1500-2500, an aromatic diamine, a moisture scavenger and a catalyst;
wherein the isocyanate component and the polyol component react to form a polyurethane based coating upon mixing the isocyanate component and the polyol component.

* * * * *

UNITED STATES PATENT AND TRADEMARK OFFICE
CERTIFICATE OF CORRECTION

PATENT NO. : 11,072,725 B2  
APPLICATION NO. : 16/225184  
DATED : July 27, 2021  
INVENTOR(S) : Jimmy Kung, John Ulcar and Dipak Parekh Page 1 of 1

It is certified that error appears in the above-identified patent and that said Letters Patent is hereby corrected as shown below:

In the Claims

In Column 10, Claim 19, Lines 10-13, please delete:
"an isocyanate component comprising one or more aromatic isocyanates, wherein the one or more aromatic isocyanates have an isocyanate (NCO) content of about 2-17%;"
And insert:
-- an isocyanate component comprising one or more aromatic isocyanates, wherein the one or more aromatic isocyanates have an isocyanate (NCO) content of 2-17%; --

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*